(12) United States Patent
Dickens et al.

(10) Patent No.: US 7,280,655 B2
(45) Date of Patent: Oct. 9, 2007

(54) DSL PROTECTOR HAVING A DETACHABLE WIRE INTERFACE

(75) Inventors: James Dickens, Ocoee, FL (US); Isaac White, Groveland, FL (US)

(73) Assignee: AT&T BLS Intellectual Property Inc., Wilmington, DE (US)

( * ) Notice: Subject to any disclaimer, the term of this patent is extended or adjusted under 35 U.S.C. 154(b) by 938 days.

(21) Appl. No.: 10/617,154

(22) Filed: Jul. 8, 2003

(65) Prior Publication Data

US 2005/0008142 A1   Jan. 13, 2005

(51) Int. Cl.
*H04M 9/00* (2006.01)
(52) U.S. Cl. .................................................. 379/412
(58) Field of Classification Search ............... 379/412
See application file for complete search history.

(56) References Cited

U.S. PATENT DOCUMENTS

| | | | |
|---|---|---|---|
| 6,026,160 A * | 2/2000 | Staber et al. | 379/413.03 |
| 6,178,080 B1 * | 1/2001 | Wilken et al. | 361/119 |
| 6,738,474 B1 * | 5/2004 | Miller | 379/413.03 |

* cited by examiner

*Primary Examiner*—Curtis Kuntz
*Assistant Examiner*—Alexander Jamal
(74) *Attorney, Agent, or Firm*—Cantor Colburn LLP

(57) ABSTRACT

An embodiment of the invention is a digital subscriber line (DSL) protection device. The DSL protection device includes a housing and protection components with the housing providing at least one of over-voltage and over-current protection. An in put twisted wire pair and an output twisted wire pair carry DSL signals. A wire interface in the housing is in electrical communication with the protection component. The wire interface detachably secures and makes electrical contact with the input twisted wire pair and the output twisted wire pair.

9 Claims, 2 Drawing Sheets

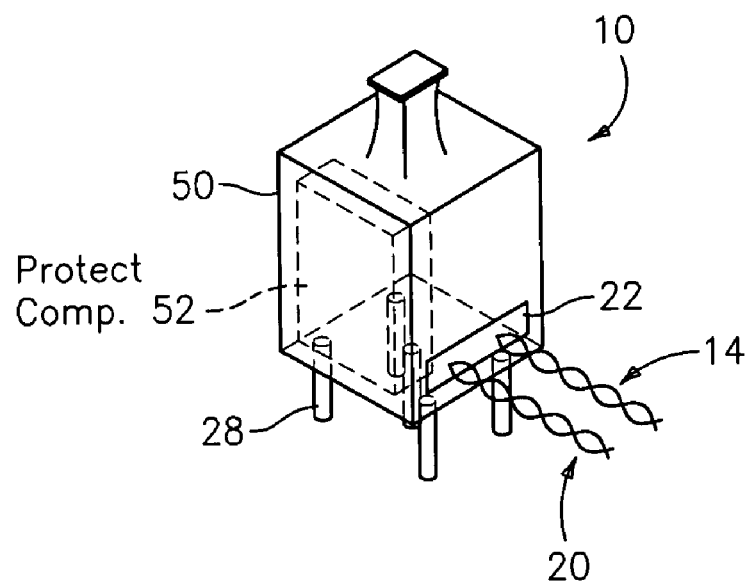
FIG. 2
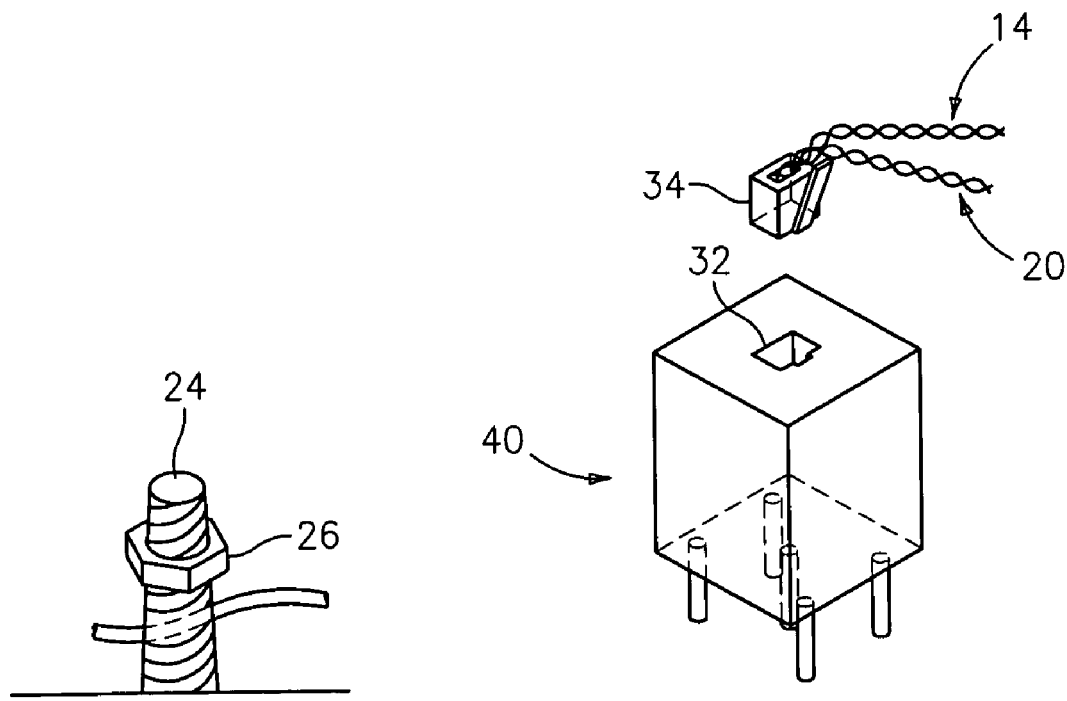
FIG. 3
FIG. 4

DSL PROTECTOR HAVING A DETACHABLE WIRE INTERFACE

BACKGROUND OF THE INVENTION

The present invention relates generally to digital subscriber line (DSL) protection devices and in particular to a DSL protection device having a detachable wire interface.

Protection devices are used to protect communication paths such as voice and data communication paths from surges (e.g., over-voltage and/or over-current conditions). Existing protection devices may use gas tube and/or solid state protection mechanisms (e.g., varistors) to provide surge protection. Such devices include a number of wires hard wired to the protection components and a plurality of pins for mating the protection device with a socket.

A drawback to existing protection devices is that the hard wiring significantly complicates the ability to service the protection device. In a typical situation, service is corrupted or interrupted on a communication path including the protection device. A technician may diagnose the service problem as relating to the protection device, but due to the hard wiring the initial technician cannot replace the protection device. A second technician, such as a DSL technician, is needed to rewire a new protection device as most technicians do not carry the tools and hardware needed for rewiring. This need for two technicians complicates the service process and unduly delays resolving the problem.

SUMMARY OF THE INVENTION

An embodiment of the invention is a digital subscriber line (DSL) protection device. The DSL protection device includes a housing and protection components with the housing providing at least one of over-voltage and over-current protection. An input twisted wire pair and an output twisted wire pair carry DSL signals. A wire interface in the housing is in electrical communication with the protection component. The wire interface detachably secures and makes electrical contact with the input twisted wire pair and the output twisted wire pair.

BRIEF DESCRIPTION OF THE DRAWINGS

Referring to the exemplary drawings wherein like elements are numbered alike in the accompanying Figures:

FIG. 2 depicts a protection device in an exemplary embodiment;

FIG. 3 depicts an exemplary detachable interface for wires;

FIG. 4 depicts a protection device in another exemplary embodiment.

DETAILED DESCRIPTION OF THE INVENTION

Figure 1:
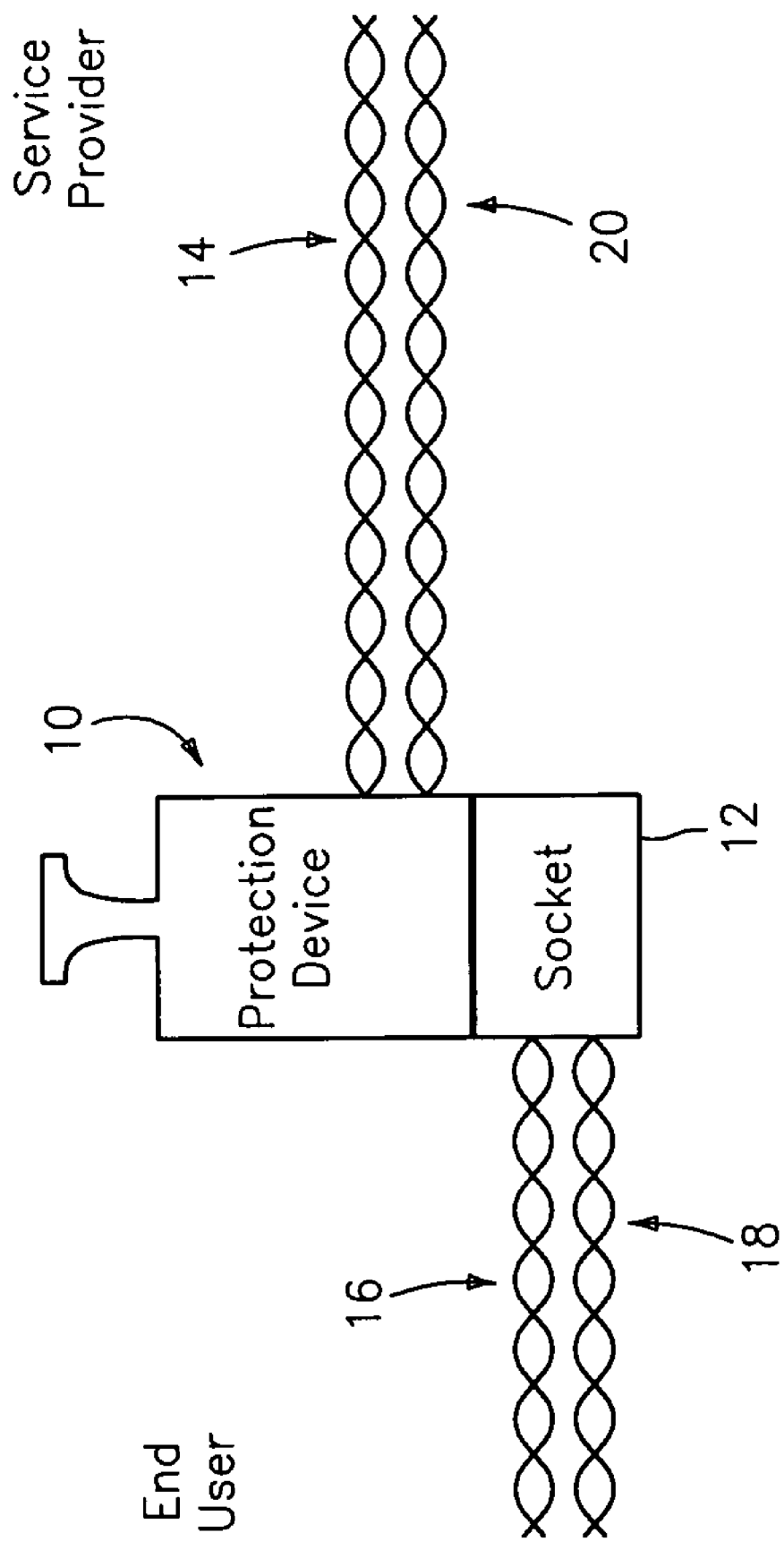
FIG. 1 depicts an exemplary protection device in a transmission path.

FIG. 1 depicts an exemplary protection device 10 in a transmission path. The protection device 10 is placed in a transmission path between a telecommunications service provider (e.g., DSL and voice) and an end user. The protection device 10 provides protection against surge conditions such as over-voltage and/or over-current.

The transmission path includes an input twisted wire pair 14 and an output twisted wire pair 20 carrying telecommunications signals (e.g., DSL signals, voice signals). The input twisted wire pair 14 is connected to another input twisted wire pair 16 through protection device 10. The output twisted wire pair 20 is connected to another output twisted wire pair 18 through protection device 10. The protection device 10 may be positioned in a variety of locations such as a central office (CO) of the service provider, a remote terminal, a DSLAM, etc.

The protection device 10 is mounted in a socket 12 to establish the connection between the input/output twisted wire pairs 14/20 and input/output twisted wire pairs 16/18. As shown in FIGS. 2 and 4, the protection device 10 includes a number of pins that engage receptacles in socket 12. The input twisted wire pair 14 and the output twisted wire pair 20 are detachable from the protection device 10 rather than hard-wired. Detachable refers to a connection that may be established or removed using no tools or minimal tools (e.g., screwdriver, allen wrench).

FIG. 2 depicts protection device 10 in one embodiment of the invention. The protection device 10 includes a housing 50 including protection components 52. The protection components 52 may be one or more known components (such as a gas tube, solid state device) that provide over-voltage and/or over-current protection. The protection components 52 are in electrical communication with the input twisted wire pair, the output twisted wire pair and pins 28.

The input twisted wire pair 14 and the output twisted wire pair 20 are detachably secured to the protection device at wire interface 22 which is in electrical communication with protection components 52 and pins 28. The wire interface 22 may use a variety of techniques to detachably secure and make electrical contact with input twisted wire pair 14 and the output twisted wire pair 20. FIG. 3 shows one exemplary wire interface including a conductive threaded post 24 and a conductive nut 26. A wire is received in an opening in the post 24. A post is provided for each wire in input twisted pair 14 and output twisted pair 20. Other detachable wire interfaces may be used such as conductive spring clamps, terminal blocks, conductive set screws, etc.

The protection device 10 includes five pins 28 including one ground pin and a pin for each wire. The twisted wire pairs include a tip wire and a ring wire. Thus, the five pins 28 correspond to input tip wire, input ring wire, output tip wire, output ring wire and ground.

FIG. 4 depicts a protection device 40 in another exemplary embodiment. In this embodiment, the detachable wire interface is provided through a plug and outlet. The protection device 40 includes a modular outlet 32 in electrical connection with the protection components 52 and pins 28. Twisted wire pair 14 and twisted wire pair 20 are connected to a modular plug 34. In an embodiment of the invention, the modular outlet 32 and modular plug 34 are RJ-45 type devices. It is understood that other plug and outlet formats may be used.

The detachable wire interface provided on the protection device allows the protection device to be removed from the input twisted wire pair and the output twisted wire pair easily. This allows a technician to remove and replace the protection device using no or minimal tools.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A digital subscriber line (DSL) protection device comprising:
   a housing;
   a protection component within said housing providing at least one of over-voltage and over-current protection;
   an input twisted wire pair and an output twisted wire pair carrying DSL signals;
   a wire interface in said housing in electrical communication with said protection component, said wire interface detachably securing and making electrical contact with said input twisted wire pair and said output twisted wire pair, wherein said input twisted wire pair includes an input tip wire and an input ring wire; said output twisted wire pair includes an output tip wire and an output ring wire;
   pins in electrical connection with said input twisted wire pair and said output twisted wire pair, said pins including a first pin in connection with said input tip wire, a second pin in connection with said input ring wire, a third pin in connection with said output tip wire, a fourth pin in connection with said output ring wire, the pins extending from a bottom surface of the housing; and
   a socket coupled to a further input twisted wire pair and a further output twisted wire pair, the socket mating with the housing and receiving the pins to establish an electrical connection between the input twisted wire pair and the further input twisted wire pair and established electrical connection between the output twisted wire pair and the further output twisted wire pair.

2. The DSL protection device of claim 1 wherein:
said pins include a ground pin.

3. The DSL protection device of claim 1 wherein:
said wire interface includes a conductive post and a conductive nut for each wire in said input twisted wire pair and said output twisted wire pair.

4. The DSL protection device of claim 1 wherein:
said wire interface a modular outlet formed in a sidewall of the housing the housing having four sidewalls containing the protection component;
said input twisted wire pair and said output twisted wire pair connected to a modular plug instable with said modular outlet.

5. The DSL protection device of claim 4 wherein:
said modular outlet and said modular plug are RJ-45 type.

6. The DSL protection device of claim 1 wherein:
said protection component includes a gas tube.

7. The DSL protection device of claim 1 wherein:
said protection component includes a solid state device.

8. The DSL protection device of claim 7 wherein:
said solid state device is a varistor.

9. The DSL protection device of claim 1 wherein:
the housing and the socket have a common footprint.

* * * * *